US008448769B2

(12) United States Patent
Knowles

(10) Patent No.: US 8,448,769 B2
(45) Date of Patent: May 28, 2013

(54) DRIVE ENGAGEMENT APPARATUS

(75) Inventor: Reginald Knowles, Nottinghamshire (GB)

(73) Assignee: Arthur Knowles, Alfreton, Derbyshire (GB)

( * ) Notice: Subject to any disclaimer, the term of this patent is extended or adjusted under 35 U.S.C. 154(b) by 705 days.

(21) Appl. No.: 12/158,897

(22) PCT Filed: Dec. 6, 2006

(86) PCT No.: PCT/GB2006/004567
§ 371 (c)(1), (2), (4) Date: Aug. 19, 2010

(87) PCT Pub. No.: WO2007/071916
PCT Pub. Date: Jun. 28, 2007

(65) Prior Publication Data
US 2011/0094843 A1    Apr. 28, 2011

(30) Foreign Application Priority Data
Dec. 23, 2005    (GB) .................................. 0526429.6

(51) Int. Cl.
*F16D 23/04*    (2006.01)
*F16D 25/08*    (2006.01)

(52) U.S. Cl.
USPC ................... 192/53.32; 192/85.56; 192/55.91

(58) Field of Classification Search
USPC .............. 192/85.49, 85.56, 53.32, 53.1, 69.9, 192/55.61
See application file for complete search history.

(56) References Cited

U.S. PATENT DOCUMENTS

| 2,640,573 | A | * | 6/1953 | Shenk | 192/53.32 |
| 3,063,529 | A | * | 11/1962 | Cook | 192/53.5 |
| 3,710,902 | A | * | 1/1973 | Hansen | 192/18 A |
| 5,036,719 | A | * | 8/1991 | Razzacki | 74/339 |

FOREIGN PATENT DOCUMENTS

| DE | 19903115 A1 | 8/2000 |
| DE | 10343074 A1 | 4/2005 |

(Continued)

OTHER PUBLICATIONS

Search Report from the Patent Office of Great Britain Under Section 17(5) of the 1977 Patents Act, for Application No. GB0526429.6; mailed Aug. 11, 2006; 3 Pages.

(Continued)

*Primary Examiner* — Richard M. Lorence
*Assistant Examiner* — Lillian Nguyen
(74) *Attorney, Agent, or Firm* — Katten Muchin Rosenman

(57) ABSTRACT

Drive engagement apparatus for engaging a driven gear with a shaft connected to a load by engaging an axially movable sleeve with a dog. One of the sleeve or dog is drivably connected to the gear and the other to the shaft. Compressed air acts to effect axial movement of the sleeve. Axial movement is delayed by a friction drive, which prevents engagement between the sleeve and dog until their rotational speeds equalise. The friction drive comprises a plurality of friction plates pushed together by the compressed air. The dog comprises an engagement unit that engages the sleeve and a base unit that is axially movable to activate and deactivate the friction drive. The base unit and engagement unit are rotatable relative to one another within a predetermined angle to adjust for misalignment between the sleeve and dog during engagement.

16 Claims, 5 Drawing Sheets

FOREIGN PATENT DOCUMENTS

| | | |
|---|---|---|
| GB | 674664 A | 6/1952 |
| GB | 2216203 A | 10/1989 |
| GB | 2309754 A | 8/1997 |
| GB | 2402722 A | 12/2004 |
| WO | 2004/109137 A | 12/2004 |

OTHER PUBLICATIONS

Notification of Transmittal of the International Search Report and the Written Opinion of the International Searching Authority No. PCT/GB2006/004567; mailed Feb. 28, 2007; 10 Pages.

* cited by examiner

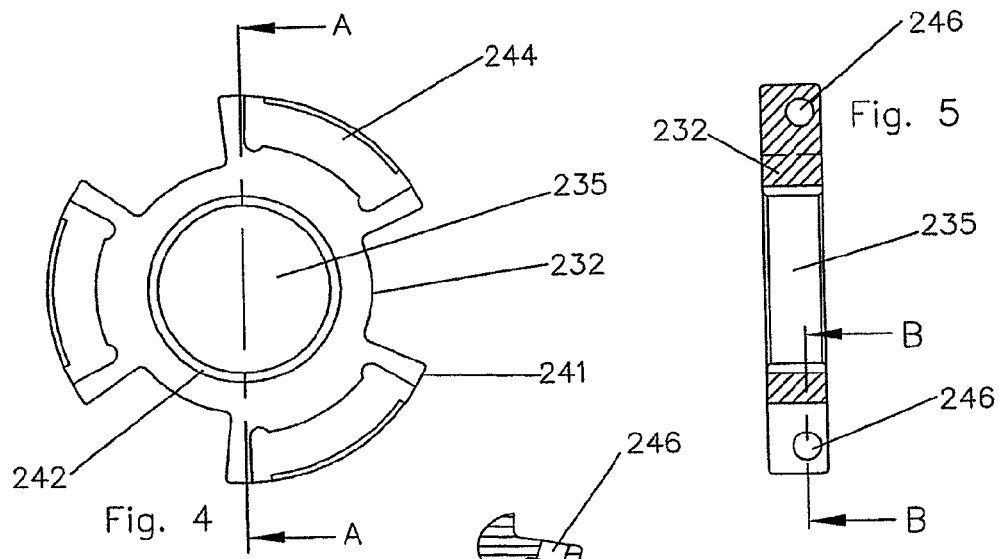
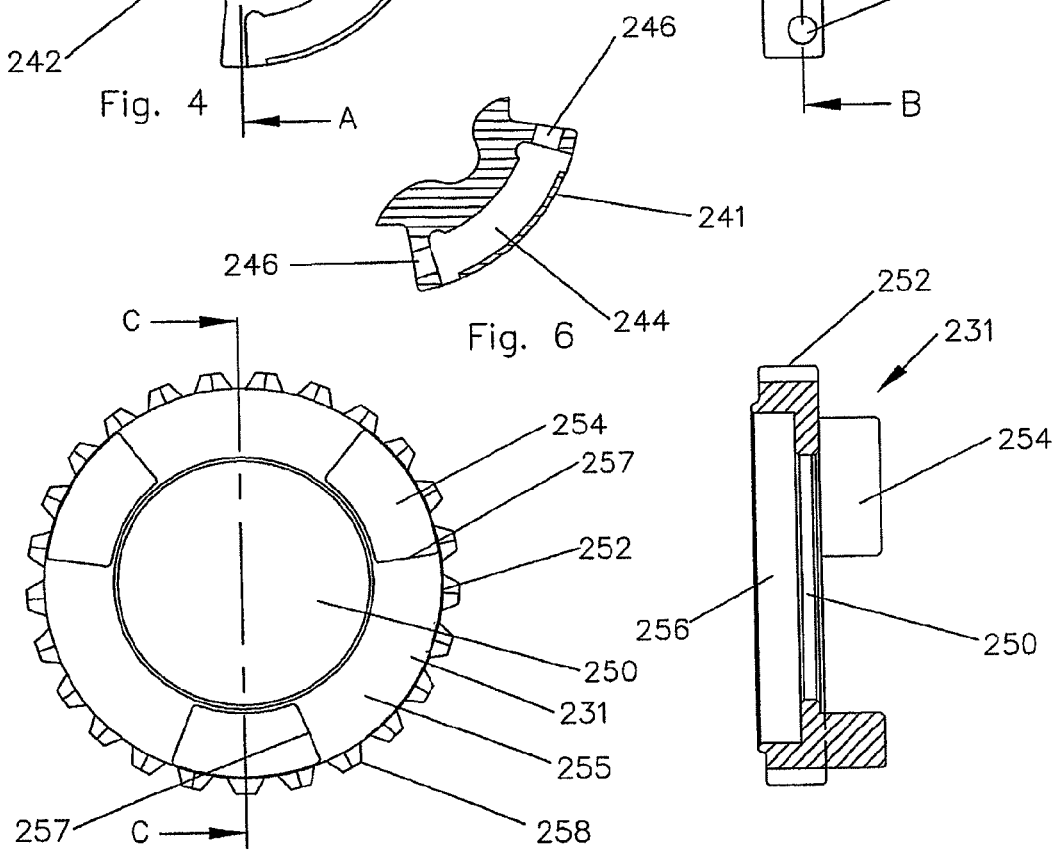

DRIVE ENGAGEMENT APPARATUS

FIELD OF THE INVENTION

The invention described herein relates to engagement devices for enabling a rotating driving member to be brought into smooth positive engagement with a load to be driven by e.g. synchronising the driving member with a driven member.

BACKGROUND TO THE INVENTION

A known clutch arrangement includes friction plates enclosed in a clutch housing. The friction plates are compressed mechanically or pneumatically by a circular piston pressing on a pressure plate, which comes into contact with the friction plates and pushes them together. An output shaft having the load to be driven attached to it, e.g. by a coupling, has alternate friction plates in mechanical cooperation with it. The other alternate friction plates (i.e. those not in cooperation with the output shaft) are in mechanical cooperation with a driving sleeve which rotates as part of the driving shaft. The clutch works by friction acting between the friction plates as they are pushed together.

GB 2216203 discloses an example of the above type of engagement device. It describes an internally splined driving sleeve movable under the action of a pneumatic ram to engage an output dog drivably connected to an output shaft—this engagement effectively makes the driving sleeve and output shaft a single mechanical member, thereby avoiding the dependence on operating air pressure. The ram has an actuating rod with a fork element attached to it, the fingers of the fork element engaging an annular groove in the outer surface of the driving sleeve. Thus, when compressed air acts on an end of the pneumatic ram, the actuating rod slides axially, moving the driving sleeve with it. The driving sleeve has a pressure plate located inside it and releasably engaged to it by means of steel balls resiliently urged into depressions formed in the inner surface of the sleeve. There are a set of friction plates, alternate ones of which are engaged with the internal splines of the driving sleeve, the remainder being engaged with the output shaft. When the sleeve is initially moved towards engagement with the output dog, the pressure plate moves axially with it and loads the friction plates against one another to begin turning the output shaft. A large torque is required to start the rotation because of the inertia of the load attached to the output shaft. This torque manifests itself as friction between the friction plates and the internal splines of the driving sleeve. This friction is enough to prevent further sliding motion of the driving sleeve until the rotational speeds of the driving sleeve and output shaft are more or less equal. The torque required to turn the output shaft is then less, so the friction acting on the splines of the driving sleeve is reduced and sliding recommences.

In WO 2004/109137, the present inventor proposed an improved arrangement of the type described in GB 2216203 wherein the functions of (i) engaging a driving member with a driven member, and (ii) activating a friction drive e.g. by pushing friction plates together were separated by incorporating a valve arrangement in the pneumatic ram, which allowed a force to act through the ram without necessarily moving the driving member. Thus, the clutch was used only to synchronise the driving and driven members, which meant that it was less likely to burn out through overloading. The valve arrangement in the piston also allowed an air controlled friction drive to be deactivated just before the moment of positive engagement of the clutch, in order for engagement to proceed smoothly.

The driving member and driven member typically have toothed projections which interlock to provide the positive engagement. On rare occasions, the driving member and driven member are synchronised so that the toothed projections become aligned and abut one another at the point of engagement, i.e. instead of intermeshing, the projection are pressed together point-to-point. One disadvantage of this is that positive engagement is not properly achieved because there is no physical interlock between the driving member and the driven member. There is therefore a risk of the driving member and the driven member slipping relative to one another, e.g. if the size of the driven load reduces for any reason. Such slipping can jar the apparatus, and may cause damage e.g. to the interlocking features. Furthermore, when engagement is missed the pneumatic ram is prevented from moving along its full axial extent but continues to be urged towards that position by the air pressure. This puts a load on the connection between the pneumatic ram and the element (e.g. fork element) that connects the ram to the member (driven or driving) which it moves. This connection may be weakened or otherwise damaged (e.g. bent out of alignment) by this force.

SUMMARY OF THE INVENTION

At its most general, the present invention provides a two-part engagement device at the interlock point between the driving member and driven member. The engagement device serves a dual purpose of activating the friction drive and adjusting for misalignment between the driving member and the driven member at interengagement. The two parts of the engagement device are rotatable relative to one another within a predetermined angle to enable interlockable features associated with the driving member and driven member to shift into a meshing configuration.

Thus, according to the present invention there may be provided apparatus for engaging a rotary driving member with an element to be driven, the apparatus including: first and second rotatable members each having an engagement portion, the first rotatable member being axially movable to interengage the respective engagement portions, and one of the first or the second rotatable members being drivably connectable to the rotary driving member and the other of the first or the second rotatable members being drivably connectable to the element to be driven such that interengagement of the respective engagement portions effects positive engagement of the rotary driving member with the element to be driven; a slidable piston connected to the first rotatable member such that pressure acting on one end of the piston causes axial movement of the piston and the first rotatable member; a clutch device having a plurality of axially movable friction plates, a first set of which are rotatably engaged with the first rotatable member and a second set of which are rotatably engaged with the second rotatable member, the plurality of friction plates being arranged to provide a friction drive when the first and second set are pushed together; wherein one of the engagement portions includes a base unit drivably connected to the rotary driving member or the element to be driven and an engagement unit mounted on the base unit and arranged to interengage with the other of the engagement portions, the base unit and the engagement unit being rotatable relative to each other within a predetermined angle to permit the respective engagement portions to occupy an orientation suitable for interengagement, and wherein the slidable piston includes a passageway arranged to permit pressure acting on the end of the piston also to act on the base unit, wherein the base unit is axially movable to activate the friction drive to substantially synchronise the rotation speeds of the first and second rotatable members before interengagement of the respective engagement portions. Thus, if the engagement portions are misaligned at engagement, the engagement unit can shift with respect to the base unit to an orientation in which the engagement portions are better aligned.

The shift of the engagement unit may be caused by contact between the two engagement portions. Preferably, the axial force of the engagement portion associated with the first rotatable member when it contacts the other engagement portion is deflected to cause the engagement unit to shift relative to the base unit.

Preferably, the apparatus includes a bias unit arranged to urge the base unit and engagement unit towards an equilibrium position. The base unit and the engagement unit may be relatively rotatable both clockwise and anticlockwise from the equilibrium position. The direction of relative rotation may be that in which the engagement unit travels a shorter distance into an orientation suitable for interengagement.

Preferably, the base unit comprises an inner annular element and the engagement unit comprises an outer annular element mounted coaxially on the inner annular element, the inner and outer annular elements having one or more interlocking stopper elements arranged to limit the rotation of the outer annular element relative to the inner annular element. The interlocking stopper elements are preferably spaced, i.e. have predetermined play, in order to achieve the limited rotation. The rotation may be limited to only a few degrees, e.g. less than 10°, more preferably less than 8°. This may correspond to a limitation of less than 5° (preferably less than 4°) in each rotation direction. Preferably, however, the rotation is limited according to the spacing of interengaging elements on the engagement portions. Thus, the rotation is preferably limited to less that the angular separation of two adjacent interengaging elements, i.e. the angular spacing between the centre of two adjacent interengaging elements on one of the engagement portions. This preferably corresponds to rotation limited to half the angular separation of two adjacent interengaging elements in each rotation direction.

Preferably, the inner annular element has a plurality of radially projecting stopper tabs which are receivable in corresponding recesses formed in the outer annular element. The circumferentially spaced walls of each recess may define a space within with a stopper tab can move. The amount of movement preferably corresponds to the difference between the circumferential spacing of the recess walls and the circumferential extent of the stopper tab. The inner annular element may comprise a star-shaped element.

Preferably, the bias unit includes biasing means arranged to urge the stopper tabs into an equilibrium position within their corresponding recesses. Each stopper tab may be urged to a substantially central position within its recess. The biasing means may include a cushion plug at each circumferential interface between a stopper tab and its corresponding recess, each cushion pad being arranged to resist rotational movement of the stopper tab away from the equilibrium position. Thus, the base unit and engagement unit may only rotate relative to one another when a torque greater than a predetermined value is applied between them. As described below, the torque may be caused by deflecting the axial force experienced between the engagement portions when the first rotatable member moves axially to interengage the engagement portions.

Preferably, each stopper tab includes a circumferential through-hole, blocked at each end by a protruding plug, each protruding plug being urged out of the through-hole by a spring to form a pair of cushion pads at each circumferential interface between a stopper tab and its corresponding recess. To rotate the engagement unit relative to the base unit in this arrangement, the stopper tab must overcome the spring force.

Preferably, the engagement unit includes a first set of projecting teeth arranged to mesh with a second set of projecting teeth on the other engagement portion. The teeth of one of the first or second set of projecting teeth may have angled outer surfaces arranged to rotatably deflect the projecting teeth of the other set when the first and second set of projecting teeth are urged against one another. For example, the projecting teeth on the engagement portion of the first rotatable member may be provided with pointed tips, which, when urged against an angled (e.g. sloping or curved) surface, move sideways.

The apparatus of the present invention preferably resembles to the drive engagement apparatus of WO 2004/109137. Thus, the piston may be slidably mounted in a housing, the piston being operably connected with the first rotatable member such that pressure acting on one end of the piston causes axial movement of the piston with respect to the housing, thereby effecting axial movement of the first rotatable member.

The friction drive actuator is preferably urged away from activating the friction drive so that the friction plates are disengaged when at rest.

Preferably, the first rotatable member moves in a first direction into positive engagement with the second rotatable member; the friction drive actuator moves in a second direction to activate the friction drive; and the first direction is substantially opposite the second direction.

Preferably, the apparatus includes restraining means to restrict initial axial movement of the piston, such that pressure acting on the piston produces movement of the friction drive actuator prior to movement of the piston.

Preferably, the piston includes a valve arrangement adapted to cause the pressure to cease acting on the base unit during interengagement between the first and second rotatable members, thereby to deactivate the friction drive. At this point, the load is taken by the second rotatable member.

Thus, at activation pressure acts on the piston in an axial direction to push the first rotatable member towards engagement with the second rotatable member. However, the pressure also activates the friction drive, and the pressure from the friction plates on the first rotatable member is enough to delay axial movement. During the delay, the friction drive causes the second rotatable member (coupled to the load) to rotate. When the rotation speeds of the first and second rotatable members are substantially synchronised, the pressure on the first rotatable member from the friction plates is reduced enough to be overcome by the pressure acting on the piston. The first rotatable member may then move into engagement with the second rotatable member. When this has occurred, since the friction drive has served its purpose, the pressure on the friction drive actuator is cut off to set free the friction plates.

Preferably, the valve arrangement maybe arranged to provide an additional air pressure supply to the piston just before engagement. This additional air supply may act as a boost to ensure the axial force exerted between the engagement portions is enough to cause the necessary relative rotation to an orientation suitable for interengagement.

The axially movable first rotatable member is preferably drivably connected to the rotary driving member and the second rotatable member is drivably connected to the element to be driven. The opposite configuration is also possible.

The second rotatable member preferably includes a gear mounted on a shaft, and the first rotatable member preferably includes a sleeve coaxial with the shaft.

BRIEF DESCRIPTION OF THE DRAWINGS

An example of the present invention is described below with reference to the accompanying drawings, in which:

FIG. 4 shows the inner member of the engagement device shown in FIG. 3;

FIG. 5 shows a cross-section of the inner member taken along the line A-A in FIG. 4;

FIG. 6 shows a cross-section of a tab portion of the inner member taken along the line B-B in FIG. 5;

FIG. 7 shows the outer member of the engagement device shown in FIG. 3;

FIG. 8 shows a cross-section of the outer member taken along the line C-C in FIG. 7;

DETAILED DESCRIPTION; FURTHER OPTIONS AND PREFERENCES

Figure 1:
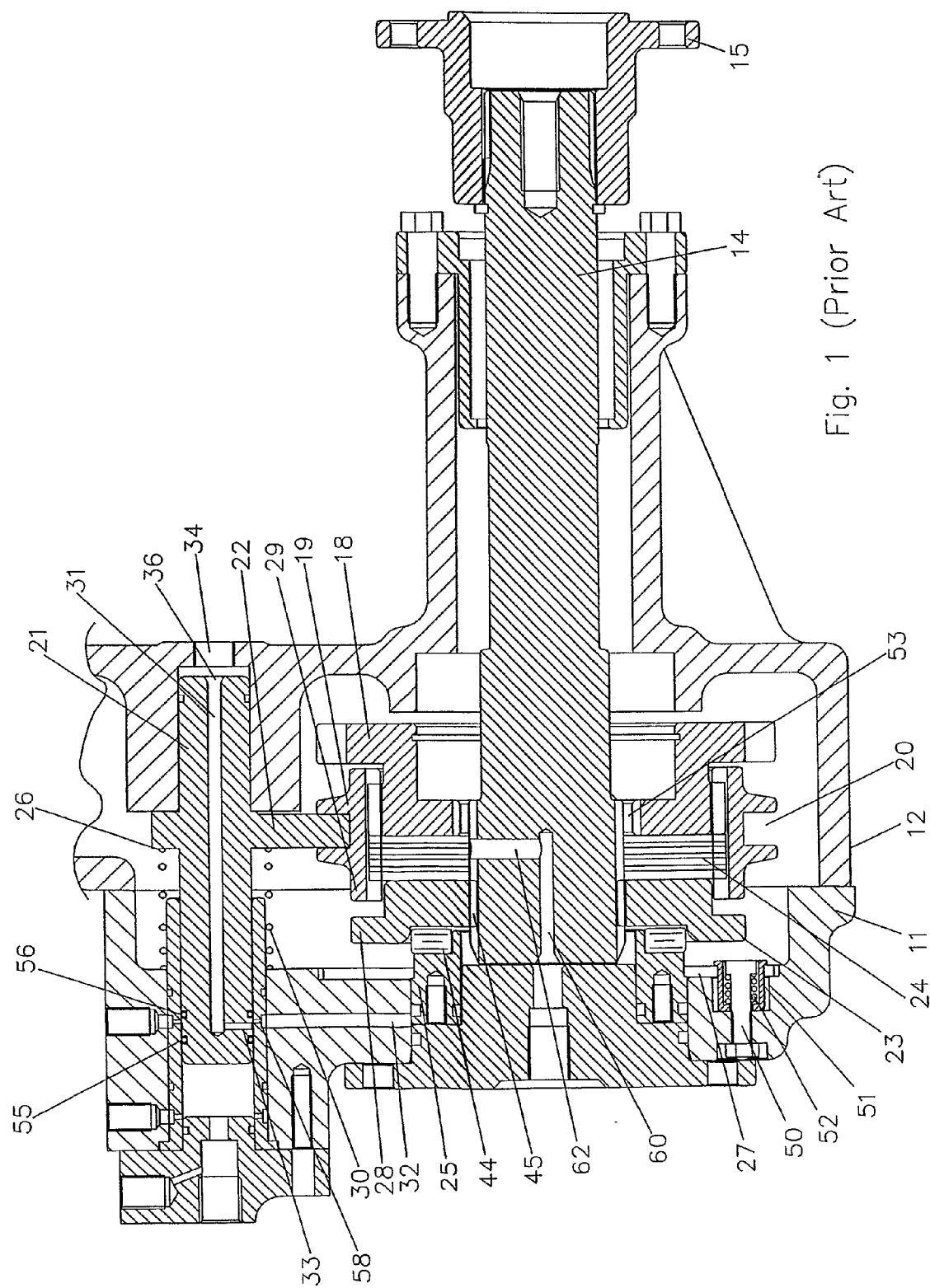
FIG. 1 shows a cross-sectional view of a known drive engagement apparatus of the type disclosed in WO 2004/109137.

FIG. 1 shows a known drive arrangement, and is described to explain how the engagement apparatus works in general and to highlight the improvement proposed by the present invention. FIG. 1 shows a housing consisting of two parts 11, 12. A driving gear 18 is externally splined to be permanently engaged to a rotating member (not shown) of an engine. Thus, when the engine is running, driving gear 18 rotates. The driving gear 18 has splines around its external surface which are keyed into internal splines on a driving sleeve 19, which is axially slidable relative to the driving gear 18.

The housing also holds an output shaft 14. The output shaft 14 extends through the centres of the driving sleeve 19 and driving gear 18, where it is located in a roller bearing 53, which allows independent rotation of the shaft 14 and driving gear 18. A protruding end of the shaft 14 has coupling 15 attached to it by means of which the drive arrangement can be attached to an external device (e.g. centrifugal fire engine pump), which needs to be driven.

Driving sleeve 19 is axially movable by piston 21, which has a fork member 22 that engages an annular groove 20 in the surface of the driving sleeve 19. Thus, when compressed air is supplied through input port 34 to space 35, piston 21 is pushed to the left as shown in FIG. 1; this would serve also to push the driving sleeve 19 to the left.

The output shaft 14 is externally splined, and an output dog 23 is slidably keyed via internal splines 45 on to it. Output dog 23 and driving sleeve 19 are arranged so that they can be drivably connected to one another via a dog tooth connection 28, 29. In other words, driving sleeve 19 can be pushed into engagement with output dog 23 to effect mechanical connection between the driving gear 18 and output shaft 14.

If the driving sleeve 19 were pushed into immediate engagement with the output dog 23, the inertia of the load connected to the output shaft 14 would give the system a large shock, which could easily damage components. It is better for the output shaft 14 (and therefore the output dog 23) to be already rotating at a similar (if not the same) speed as the driving sleeve 19 when engagement occurs, to minimise any shock loading. To delay the moment of engagement, friction plates 24 are provided between the driving gear 18 and the output dog 23. Alternate ones of the friction plates have internal splines which engage on the external splines of output shaft 14, therefore rotate with that shaft. The other alternate friction plates have external splines that engage with the internal splines of the driving sleeve 19; the friction plates 24 are able to slide axially relative to one another.

When the piston 21 is in the rightmost position in FIG. 1 (i.e. disengaged or 'parked'), there is a gap between the output dog 23 and the driving gear 18 so that there is free play between the friction plates 24. Thus, when the friction plates are not in use, the two sets of plates can rotate relative to one another relatively easily.

On the opposite side of the output dog 23 from the friction plates 24, there is a annular ring 25 mounted in a cylinder formed in the housing. The ring 25 has a pressure plate 27 attached to it which engages the output dog 23 via roller bearing 44. The arrangement is such that when e.g. compressed air is provided to the cylinder, the ring 25 is pushed to the right as seen in FIG. I. Thus, the pressure plate 27 pushes the output dog 23 via thrust bearing 44 to the right; the output dog 23 pushes the friction plates 24 together, squeezing them between the output dog 23 and the driving gear 18, thereby activating a friction drive on the output shaft.

One set of friction plates 24 are axially slidably engaged with the internal splines of the sleeve 19. These plates are interposed by another set of friction plates which are axially slidably engaged with external splines on the output shaft 14. The friction drive is actuated when both sets of friction plates are pressed together. A passageway 60 and radial hole 62 are provided in the output shaft to enable lubricant (e.g. oil) to be delivered to the friction plates.

Fluid (e.g. compressed air) is provided to the cylinder by a bore 32 drilled in the housing. The compressed air for moving the ring 25 comes from the same port 34 as the compressed air for moving piston 21. The piston 21 has a passageway 31 drilled in it which has a port 36 at one end that opens into space 35. At the other end, a radial hole 33 links the passageway 31 to bore 32, i.e. it allows compressed air communication between the port 34 and cylinder 26.

As shown in FIG. 1, the intermediate portion of the piston 21 has a coiled spring 30 fitted around it that pushes against the wall of the housing and an upstanding ridge 26 on the piston, i.e. it acts to push the piston 21 to the right in FIG. 1, i.e. it acts to stop driving sleeve 19 from being pushed immediately into engagement with output dog 23. In fact, the spring is of a particular biasing strength so that, when e.g. compressed air is provided from port 34 to space 35, travel of the piston 21 is restricted enough by the spring 30 so that the compressed air communicates first with the ring 25 and therefore acts on the output dog 23 first. In other words, the spring 30 ensures that the friction drive on the output shaft is initiated by movement of the output dog 23 before the driving sleeve 19 moves significantly.

The leftmost end of piston 21 also includes annular grooves located on either side of the radial hole 33. The grooves contain sealing rings 55, 56 which define a zone around the end portion when it is located in the housing in which the pressure from radial hole 33 can act. Thus, the piston 21 itself can act as a valve for the pressure acting through the passageway 31. When the zone is positioned over the bore 32, the pressure through the passageway 31 can act on the ring 25, whereas if the piston 21 is moves axially so that one of the sealing rings 55, 56 moves over the entrance to the bore 32, the ring 25 will be isolated from the pressure.

FIG. 1 shows the arrangement in a disengaged position. Piston 21 is at its rightmost position. Output shaft 14 is thus not driven. To move to an engaged state, compressed air is provided into space 35 via port 34. The spring 30 restricts the movement of the piston 21 under this pressure, such that the pressure acts first on ring 25 in cylinder 26 via passageway 31 and radial hole 33 and bore 32. The ring 25 pushes pressure plate 27 against output dog 23, which slides so as to push the friction plates 24 together. This movement is relatively small: the output dog 23 is unable to slide into engagement with the drive sleeve 19; the sleeve itself must move to effect engagement. Friction between the alternate plates that rotate with the sleeve and the plates engaged with the output shaft 14 makes the shaft 14 start to turn. However, the torque required for this means high contact pressures act against the side surfaces of the internal splines of the driving sleeve 19 which prevent it from moving to the right (i.e. to engage with the output dog 23). However, as the output shaft 14 increases in speed, the torque required lessens so that the contact pressures reduce to allow the pneumatic force on the driving sleeve 19 to overcome the restraining force of the spring 30 so that it begins to slide into full engagement with output dog 23. The pneumatic force through radial hole 33 acts from the zone defined by sealing rings 55, 56. That zone is positioned so that as the driving sleeve 19 begins to slide into full engagement with the output dog 23, the compressed air supply to output dog 23 is cut off.

Pressure plate 27 has a pull-back mechanism where it (and ring 25) are urged fully back towards the housing when pressure is removed. The pull-back mechanism has a bolt 50 fixed in a recess in the housing. The bolt has a cylinder 51 slidably mounted on it and biased away from it (to the left in FIG. 1) by a spring 52. Cylinder 51 is attached to pressure plate 27 such that it acts to pull the plate towards the housing.

In detail, as the piston 21 moves axially, sealing ring (e.g. o-ring) 56 moves over the radial hole(s) 58 to stop the compressed air from reaching the ring 25. The ring 25 is then pulled away from the output dog 23 by pressure plate 27, which acts under the influence of spring 52 contained between bolt 50 and cylinder 51 as in FIG. 1. The friction drive is therefore deactivated at the point of engagement between the sleeve 19 and output dog 23.

The relatively large area on which air pressure may act on ring 25 allows a greater force than previously known devices to be applied here, which may allow the clutch to start up with a certain amount of load already connected. This is in contrast to the previous device, where a zero-load condition was recommended for start up to avoid clutch plate slippage.

Figure 2:
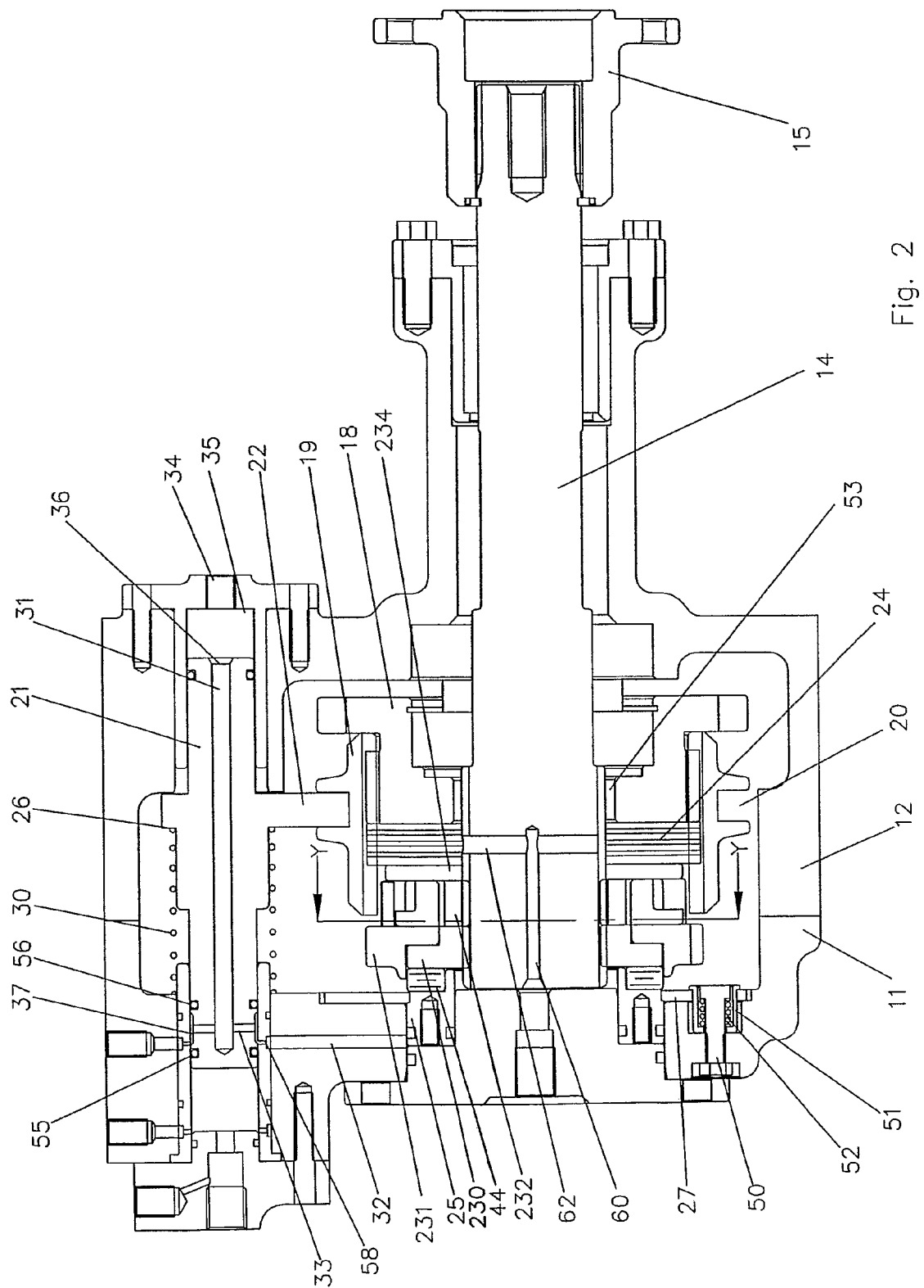
FIG. 2 shows a cross-sectional view of drive engagement apparatus which is an embodiment of the present invention.

FIG. 2 shows a driving engagement apparatus which is a modified version of the apparatus shown in FIG. 1 and is an embodiment of the present invention. The basic operation of the engagement apparatus is the same as in FIG. 1, and parts which perform the same function are given the same reference numerals. The modification concerns the engagement between the sleeve 19 and the output dog 23. In FIG. 2, the output dog comprises a plurality of parts. Firstly, there is a thrust plate 230 which provides a surface for the bearing 44 to abut. Thus, when compressed air acts on the ring 25 to push the pressure plate 27 outwards, the thrust plate 230 (which is in splined engagement with the shaft 14) moves axially along the shaft 14 toward the friction plates 24. Adjacent the thrust plate 230, and also in splined engagement with the shaft 14, is a star plate 232 which has an outer engagement plate 231 mounted on it. This structure is described in detail below. Both the thrust plate 230 and the star plate 232 are drivably connected to (and therefore rotate with) the shaft 14. The outer engagement plate 231 is mounted on the star plate 232 in a way that permits it to rotate relative to the star plate 232 and the thrust plate 230 within a predetermined angle. The engagement plate 231 and sleeve 19 are arranged so that they can be drivably connected to one another via a dog tooth connection 193, 252 (see FIGS. 7 and 10). Thus, sleeve 19 is axially moved into engagement with outer engagement plate 231 in order to drivably connect the driving gear 18 to the shaft 14.

Since engagement plate 231 may only rotate relative to star plate 232 within a predetermined angle, it rotates with the shaft 14 when the friction drive is activated. Similarly to FIG. 1, therefore, engagement plate 231 is rotating at a similar (if not identical) speed to sleeve 19 at the point of engagement.

The clutch will have a non-zero torque capacity which enables it to start a certain amount of load. In this case, the sleeve 19 would axially slide into the engagement plate 231 immediately. This is undesirable as it would cause the dog tooth connections on the sleeve 19 and engagement plate 231 to rotate against on another and take a large proportion of the loading force. This can lead to damage. To prevent this, the air pressure is selected to ensure that the force exerted by the thrust plate 230 on the clutch exceeds the torque capacity of the clutch. This ensures that the rotation speeds of the sleeve 19 and engagement plate 231 are substantially equalised before they interengage, i.e. before the dog tooth connectors (splines) contact one another.

Finally, just before the full engagement, i.e. when the piston 21 has almost completed its travel (to the leftmost position in FIG. 2), the piston valve represented by o-rings 55, 56 cuts off the air pressure to the thrust plate 230, thereby allowing the clutch plates freedom to move (i.e. effectively disengaging the friction drive). O-rings 55, 56 define the zone 37 in which air pressure through radial hole 33 acts. Just before full engagement, o-ring 56 moves over the hole 58 to isolate the zone 37 from the passageway 32 to the ring 25.

Thus, activating the clutch when air is supplied to the piston 21 causes the axial movement of the piston 21 to be delayed due to the pressure on the friction plates 24 in the clutch housing (sleeve 19). Only when the rotation of the self-centring movable dog (star plate 232 and engagement plate 231) is substantially synchronised with the sleeve 19 does the pressure on the sleeve 19 reduce enough to allow the piston 21 to continue its axial travel. Interengagement of the sleeve 19 and self-centring movable dog 231,232 then occurs, at which point the clutch has served its purpose, as the sleeve 19 is halfway into full engagement. Thus, the clutch can be deactivated, which is achieved by cutting off the air supply to the operating piston 25.

The self-centring movable dog 231,232 has a dual function. Firstly it comprises two parts that are rotatable relative to one another to provide smooth interengagement. Secondly, it is axially movable to activate the synchronisation of the sleeve 19 with the rotatable dog.

Figure 3:
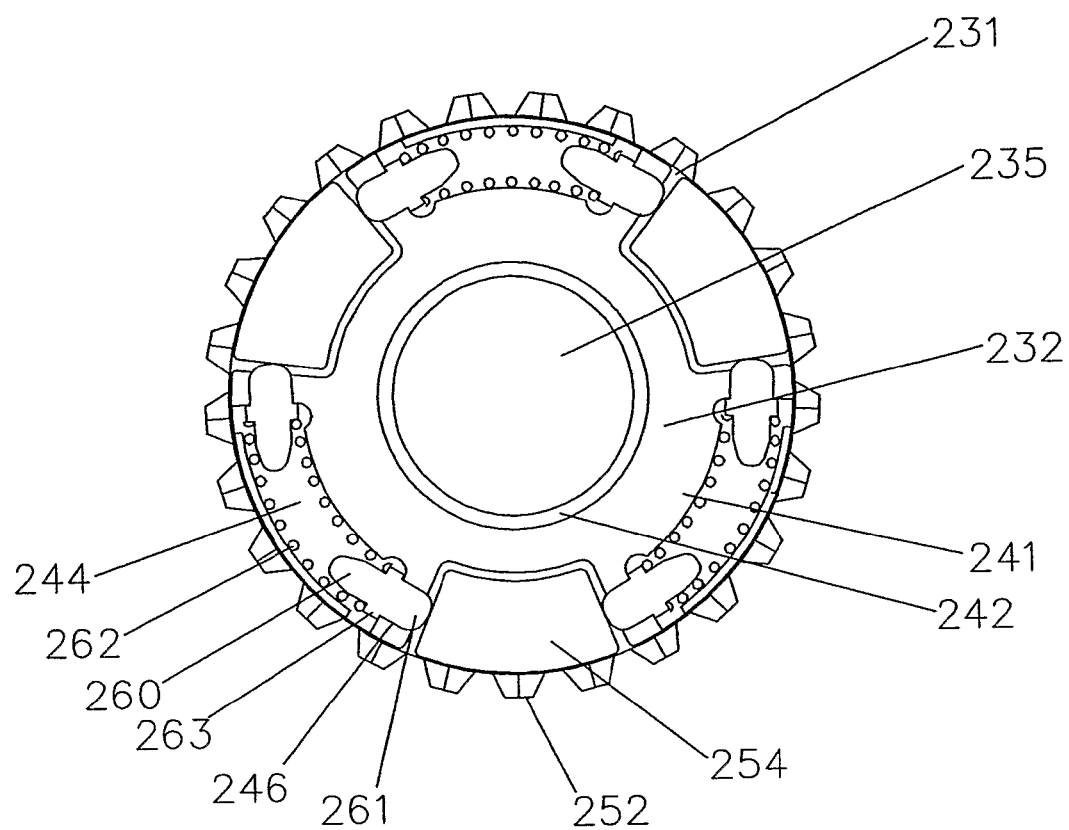
FIG. 3 shows a cross-sectional view of the two-part engagement device of the present invention taken along the line Y-Y in FIG. 2.

The difference between the apparatus in FIG. 1 and FIG. 2 is that the engagement plates 231 may shift slightly relative to the star plate 232 at the point of engagement to ensure that the dog tooth connection properly engages. The mechanism for this is illustrated in FIG. 3. FIG. 3 shows a cross-section view through the star plate 232 and engagement plates 231. The star plate has a central bore 235 for receiving the shaft 14. The bore 235 has internal splines (illustrated figuratively at 242) which are keyed into external splines on the outer surface of the shaft 14. The star plate 232 has an inner annular element from which three regularly spaced stopper tabs 241 protrude in radial directions. Each stopper tab extends for about 70 degrees around the circumference of the inner annular element. This arrangement is shown in detail in FIG. 4. The outer engagement plate 231 is shown in FIG. 7. It comprises a central bore 250 which receives the inner annular element of the star plate 232. Surrounding the bore 250 are three equally spaced projections 254 which define circumferential recesses 255 between them. The projections 254 and recesses 255 are shaped so that the stopper tabs 241 of the star plate 232 each fit into a recess 255 of the outer engagement plate 231. The angular extent of the recess 255 is greater than the angular extent of the stopper tabs 241 so that relative angular movement (rotation about an axis perpendicular to the bores 235, 250) between the outer engagement plate 221 and the star plate 232 is permitted. The amount of relative angular rotation permitted is governed by the difference in angular extent between the stopper tab 234 and its recess 255.

FIG. 7 shows that the outer engagement plate has a plurality of teeth 252 around its outer edge. These are adapted to inter engage with inwardly projecting teeth 193 on the sleeve 19 (see FIGS. 9 and 10). The surface of the teeth 252 on the outer engagement plate 231 facing the sleeve 19 are chamfered or otherwise angled e.g. as two angled surfaces 258 sloping away from a ridge. Similarly, the parts of the teeth 193 on the sleeve 19 that face towards the teeth 252 on the outer engagement plate 231 are shaped into points 194. When the points 194 contact the angled (sloped) surfaces 258, the axial force on the sleeve is deflected to cause the outer engagement plate 231 to rotate relative to the star plate 232. The direction of rotation depends on the orientation of the angled surface 258.

FIG. 3 also illustrates a cushioning mechanism that urges the outer engagement plates 231 into an equilibrium position relative to the star plate 232. The cushioning mechanism stabilises the system and prevents rattling due to loose movement between the outer engagement plate 231 and the star plate 232. The cushioning mechanism comprises three pairs of cushion plugs 260, each pair associated with one of the stopper tabs 241 of the star plate 232. As shown in FIGS. 4, 5 and 6, each stopper tab 241 comprises a circumferential passageway 244 which can communicate with the side walls 257 of each recess via slots 246. Each cushion plug 260 has an abutment portion 261 shaped to protrude through a slot 246 to contact the recess side wall 257. Each cushion plug 260 is urged out of its slot 246 by a spring 262 located in the circumferential passageway 244. To prevent the cushion plug from being completely pushed through its slot 246, each plug 260 has a central ridge 263 whose diameter is greater than the diameter of the slot 246. By urging each pair of cushion plugs 260 outwards into contact with the walls of their respective recess 255, the outer engagement plate 231 is maintained in a equilibrium position where each stopper tab 241 of the star plate 232 is held substantially centrally in each recess 255 of the outer engagement plate 231.

To cause relative movement between the outer engagement plate 231 and the star plate 232, a torque must be applied to the outer engagement plate 231 that overcomes the force due to the springs 262. When this occurs, one of each pair of cushion plugs 260 will be pushed back into the stopper tab 241 by the rotating outer engagement plate 231.

Thus, the force of the sleeve 19 on the engagement plate 231 due to the air pressure on the piston 21 is enough to overcome the force of the springs 262, therefore permitting full mechanical contact by the dog tooth connectors (splines) on the sleeve 19 and engagement plate 231.

FIG. 8 shows that the back side of the outer engagement plate 231 includes a bore 256 shaped to enclose the thrust plate 230. There is no mechanical engagement between these two plates.

Figure 9:
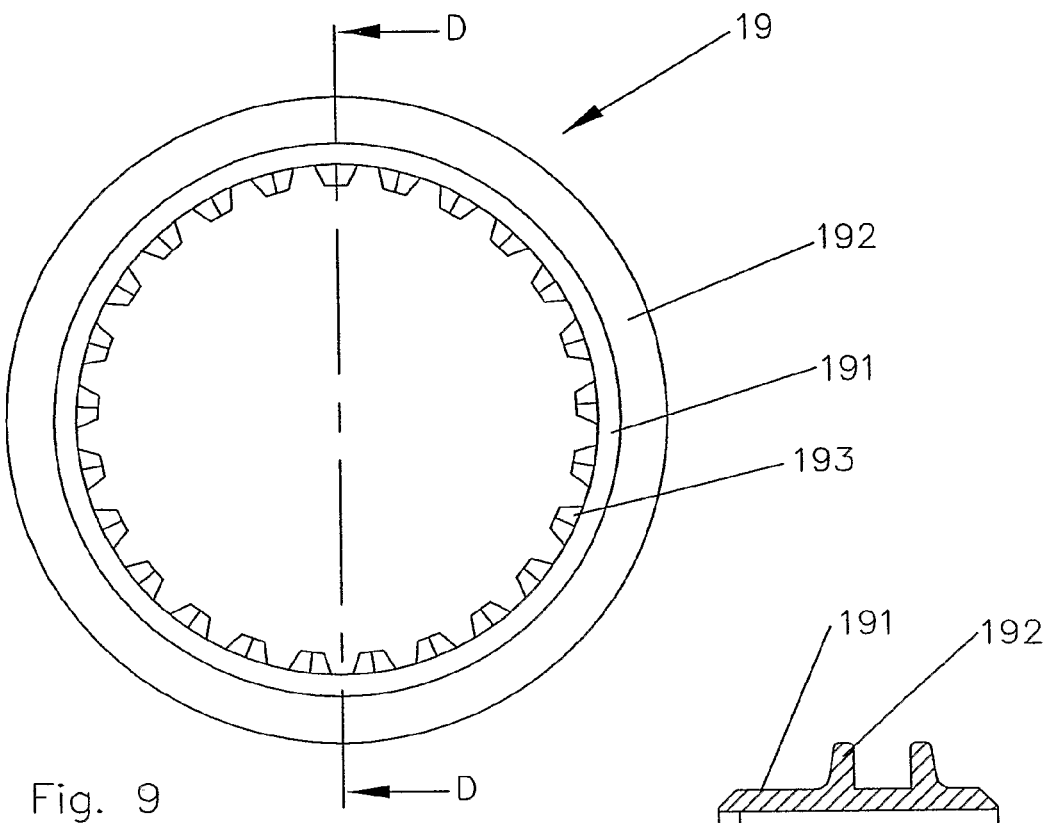
FIG. 9 shows a front view of the axially movable sleeve of the present invention.
Figure 10:
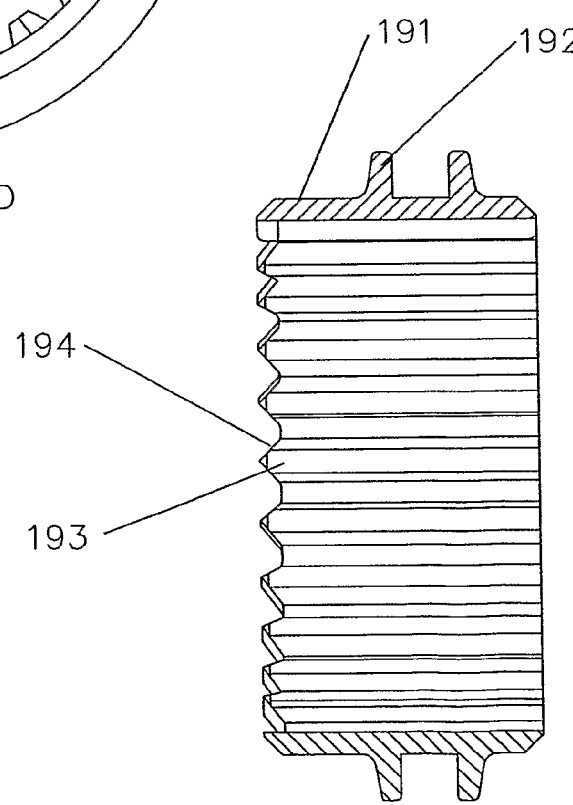
FIG. 10 shows a cross-section of the sleeve taken along the line D-D in FIG. 9.

FIGS. 9 and 10 show in detail the sleeve 19. The teeth 193 are discussed above. These project inwardly from the outer body 191 of the sleeve 19. The outer body 191 includes upstanding projections 192 which form the groove 20 for receiving the selector fork 22.

The invention claimed is:

1. Apparatus for engaging a rotary driving member with an element to be driven, the apparatus including:
    first and second rotatable members each having an engagement portion, the first rotatable member being axially movable to interengage the respective engagement portions, and one of the first or the second rotatable members being drivably connectable to the rotary driving member and the other of the first or the second rotatable members being drivably connectable to the element to be driven such that interengagement of the respective engagement portions effects positive engagement of the rotary driving member with the element to be driven;
    a slidable piston connected to the first rotatable member such that pressure acting on one end of the piston causes axial movement of the piston and the first rotatable member;
    a clutch device having a plurality of axially movable friction plates, a first set of which are rotatably engaged with the first rotatable member and a second set of which are rotatably engaged with the second rotatable member, the plurality of friction plates being arranged to provide a friction drive when the first and second set are pushed together;
    wherein one of the engagement portions includes a base unit drivably connected to the rotary driving member or the element to be driven and an engagement unit mounted on the base unit and arranged to interengage with the other of the engagement portions, the base unit and the engagement unit being rotatable relative to each other within a predetermined angle to permit the respective engagement portions to occupy an orientation suitable for interengagement,
    wherein the slidable piston includes a passageway arranged to permit pressure acting on the end of the piston also to act on the base unit, wherein the base unit is axially movable to activate the friction drive to substantially synchronise the rotation speeds of the first and second rotatable members before interengagement of the respective engagement portions, and
    wherein the base unit comprises an inner annular element and the engagement unit comprises an outer annular element mounted coaxially on the inner annular element, the inner and outer annular elements having one or more circumferentially interlocking stopper elements arranged to limit the rotation of the outer annular element relative to the inner annular element.

2. Apparatus according to claim 1, including a bias unit arranged to urge the base unit and engagement unit towards an equilibrium position.

3. Apparatus according to claim 2, wherein the base unit and the engagement unit are relatively rotatable both clockwise and anticlockwise from the equilibrium position.

4. Apparatus according to claim 2, wherein the one or more circumferentially interlocking stopper elements comprise a plurality of radially projecting stopper tabs on the inner annular element which are receivable in corresponding recesses formed in the outer annular element, and wherein the bias unit includes biasing means arranged to urge the stopper tabs into an equilibrium position within their corresponding recesses.

5. Apparatus according to claim 4, wherein the biasing means includes a cushion pad at each circumferential interface between a respective one of the stopper tabs and its corresponding recess, each cushion pad being arranged to resist rotational movement of the respective stopper tab away from the equilibrium position.

6. Apparatus according to claim 5, wherein each stopper tab includes a circumferential through-hole, blocked at each end by a protruding plug, each protruding plug being urged out of the through-hole by a spring to form a respective cushion pad at each circumferential interface between a respective one of the stopper tabs and its corresponding recess.

7. Apparatus according to claim 1, wherein the one or more circumferentially interlocking stopper elements comprise a plurality of radially projecting stopper tabs on the inner annular element which are receivable in corresponding recesses formed in the outer annular element.

8. Apparatus according to claim 1, wherein the engagement unit includes a first set of projecting teeth arranged to mesh a second set of projecting teeth on the other engagement portion.

9. Apparatus according to claim 8, wherein one of the first or second set of projecting teeth have angled outer surfaces arranged to rotatably deflect the projecting teeth of the other set when the first and second set of projecting teeth contact one another.

10. Apparatus according to claim 1, wherein
the first rotatable member moves in a first direction into positive engagement with the second rotatable member;
the base unit moves in a second direction to activate the friction drive; and
the first direction is substantially opposite the second direction.

11. Apparatus according to claim 1 having restraining means to restrict initial axial movement of the piston, such that pressure acting on the piston causes axial movement of the base unit prior to movement of the piston.

12. Apparatus according to claim 1, wherein the piston includes a valve arrangement adapted to cause the pressure to cease acting on the base unit during interengagement between the first and second rotatable members, thereby to deactivate the friction drive.

13. Apparatus according to claim 1, wherein the base unit is urged away from activating the friction drive.

14. Apparatus according to claim 1, wherein the axially movable first rotatable member is drivably connected to the rotary driving member and the second rotatable member is drivably connected to the element to be driven.

15. Apparatus according to claim 1, wherein the second rotatable member includes a gear mounted on a shaft.

16. Apparatus according to claim 15, wherein the first rotatable member includes a sleeve coaxial with the shaft.

* * * * *